United States Patent [19]

Kabanuk et al.

[11] Patent Number: 4,896,776

[45] Date of Patent: Jan. 30, 1990

[54] PROTECTIVE CARRYING CASE FOR DATA PROCESSING EQUIPMENT

[75] Inventors: Bradley J. Kabanuk, Minneapolis; Gale L. Jacobsen, Northfield, both of Minn.

[73] Assignee: Gemini Incorporated, Cannon Falls, Minn.

[21] Appl. No.: 266,516

[22] Filed: Nov. 3, 1988

[51] Int. Cl.[4] .............................................. B61D 85/38
[52] U.S. Cl. .................................... 206/576; 206/305; 206/449
[58] Field of Search ............... 206/356, 305, 328, 576, 206/449

[56] References Cited

U.S. PATENT DOCUMENTS 4,658,956  4/1987  Takeda et al. ...................... 206/305
4,790,431  12/1988  Reel et al. ............................ 206/305

Primary Examiner—Joseph Man-Fu Moy
Attorney, Agent, or Firm—Haugen and Nikolai

[57] ABSTRACT

A protective case for carrying data processing equipment includes top and bottom shells pivotally mounted to one another for opening and closing the case. A vacuum-formed insert, mounted contiguously within the bottom shell by an adhesive, includes either a single platform or a pair of raised platforms for supporting a computer at a sufficient height to permit the housing of electrical cords beneath the computer. The vacuum-formed insert further includes either a single pedestal or a pair of pedestals for supporting a computer-operated printer, at a sufficient height for storage of computer printer paper beneath the printer, and operatively disposed to facilitate use of the printer while supported on the pedestals. The insert further can include a channel for storage of a power supply and a switching and outlet unit for use with the computer and printer. In the event that the computer incorporates a disc drive, a pocket for containing data storage discs is mounted to the top shell of the case.

16 Claims, 2 Drawing Sheets

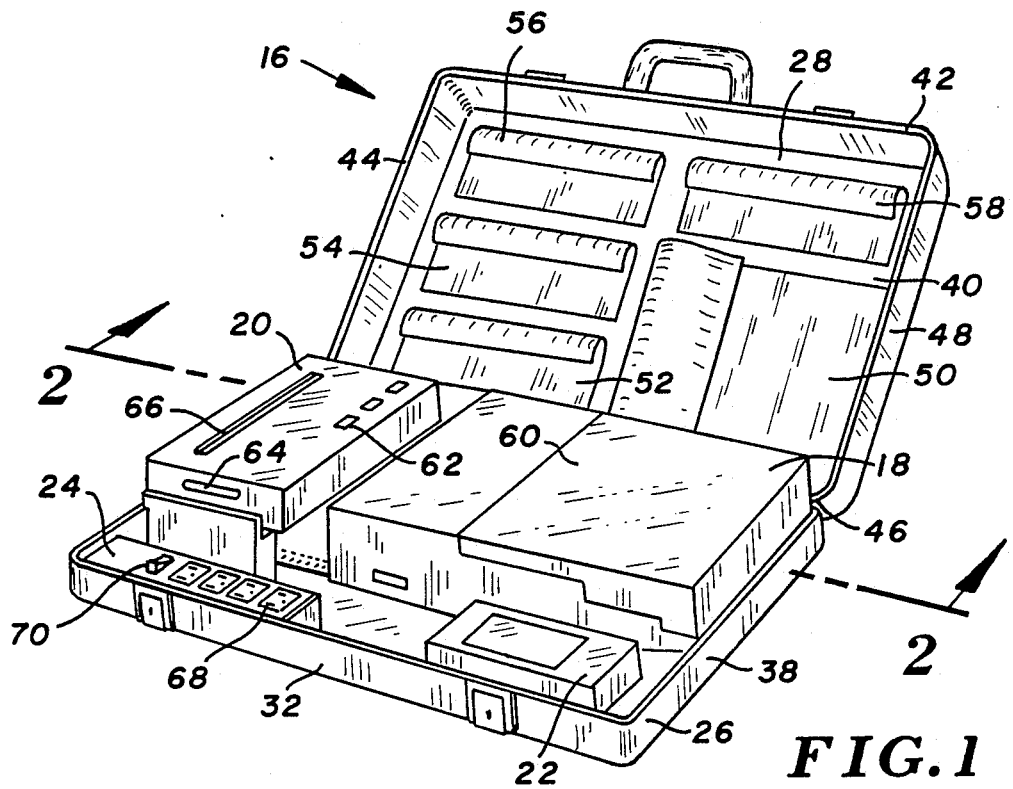
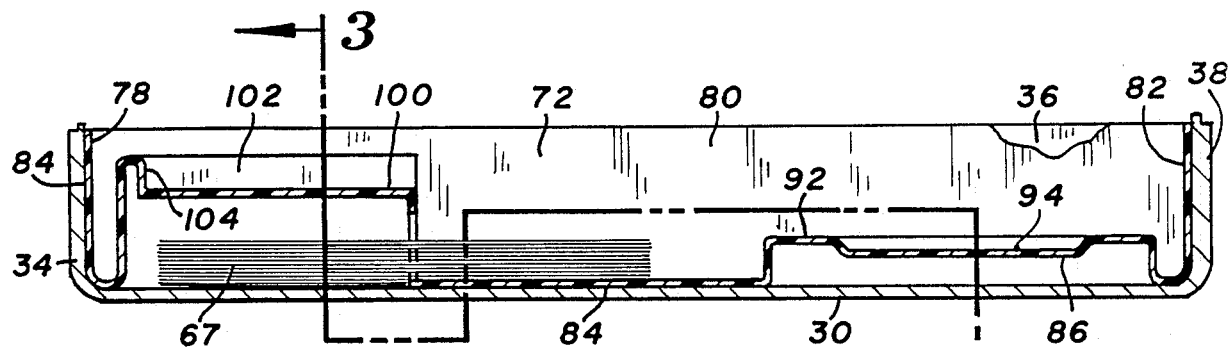
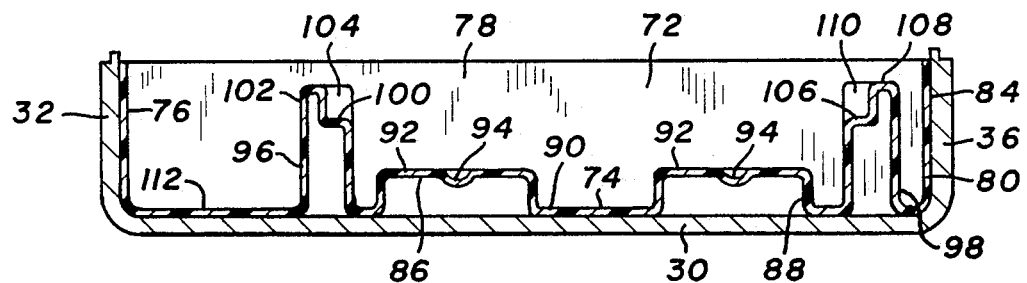

PROTECTIVE CARRYING CASE FOR DATA PROCESSING EQUIPMENT

BACKGROUND OF THE INVENTION

This invention relates to protective enclosures, and more particularly to carrying cases for transporting computing equipment, delicate instruments and the like.

The advent of the personal computer has made data processing readily available to small businesses and households alike, due to the reduced cost of computing equipment. Another important factor is the substantial reduction in size of such equipment, to the point where it frequently is called "lap-top" or in other respects identified as of a convenient carrying size. Accordingly, employees nowadays can conveniently transport computing equipment between the home and workplace, and business travelers frequently carry such equipment as part of their luggage on business trips.

Of course, traveling with personal computing equipment gives rise to the need to protect such equipment during transport. Computers, disc drives, printers and the like, are delicate and subject to injury from any undue physical shock, for example due to careless handling or jostling. It is desirable that separate components of equipment be stored together in transit, for ready and convenient access. It further is desirable that the several components be stored in a manner to facilitate their interconnection and use in transit, for example by an airline, train or automobile passenger.

Therefore, it is an object of the present invention to provide a single enclosure for transporting various components of data processing equipment in a manner to protect the components against damage.

Another object is to support the various components in such enclosure in a manner that facilitates their interconnection and use while contained in the enclosure.

Yet another object is to provide an enclosure adaptable to various types of computing equipment, including central processing units, printers and the like.

SUMMARY OF THE INVENTION

To achieve these and other objects, there is provided a protective case for transporting data processing equipment. The case includes a substantially rigid bottom shell having a substantially flat bottom wall and a first side wall means extended upwardly of the perimeter of the bottom wall. The case further has a rigid top shell with a substantially flat top wall and a second side wall means extended normal to the top wall from the perimeter of the top wall. The top and bottom shells are adapted to releasably engage one another along their respective side wall means to form an enclosure. A first platform means is provided integral with the bottom shell for removably supporting a computer in spaced apart relation to the bottom wall at a first selected vertical height from the bottom wall, and further in a selected orientation to facilitate use of the computer when it is supported in the bottom shell. A second mounting means, also integral with the bottom shell, releasably and integrally supports a printer in spaced apart relation to the bottom wall and at a second selected vertical distance from the bottom wall. Further, the second mounting means supports the printer in a select orientation to facilitate use of the printer while it is supported in the bottom shell. A compartment or space is provided within the bottom shell for housing a power supply means for providing electrical power to the computer and the printer.

Preferably the first mounting means includes a platform raised above and parallel to the bottom wall. The second mounting means can include a pedestal having a horizontal pedestal surface and opposed first and second projections extended vertically upward of opposite sides of the pedestal surface. The projections are parallel to one another and spaced apart a distance equal to the length dimension of the printer. Consequently, the printer is secured between the projections and rests upon the raised horizontal pedestal surface.

Alternatively, the first mounting means can include two spaced apart platforms, raised above and parallel to the bottom wall. The second mounting means can include two upright pedestals, each with a horizontal pedestal surface and a first projection extended vertically upwardly of the pedestal surface. The first projections are parallel to one another and spaced apart a distance equal to the length dimension of the printer. As a result, the printer is frictionally secured with respect to the bottom shell when it is positioned between the two first projections.

Each of the pedestals further can include a second projection also extended vertically upward of the pedestal surface, and perpendicular to the first projection. The second projections are positioned to engage an edge of the printer, and thereby cooperate with the first projections to positively align the printer with respect to the bottom shell.

The platforms and pedestals advantageously can comprise separate elements of a unitary vacuum-formed plastic insert, which includes a floor contiguous with the bottom wall, and an insert side wall means extended normally of the floor and contiguous with the first side wall means of the bottom shell. An adhesive secures the vacuum-formed insert to the shell.

The mounting means support the computer at a sufficient height to permit the necessary wires for electrical connections to be stored and maintained beneath the computer, and maintain the printer well above the bottom wall, and further are arranged to permit stacking of paper beneath the printer for direct feeding to the printer. In addition, the greater height at which the printer is supported can position the top of the printer, if desired, at a height substantially equal to the top of the computer, so that closure of the case brings the top wall of the upper shell against the printer and computer. This secures these components to protect them against any damage that might arise from careless handling of the case.

A further aspect of the invention is a pouch or pocket that can be releasably secured to the top wall. The pocket is constructed of a size to house data storage discs, and thus is particularly well suited for use with a computer having a built-in disc drive. The pocket is constructed of a pliable material, for example leather or a soft vinyl, to protect the discs and computing equipment.

In accordance with the present invention, the equipment within the case is arranged in a manner to facilitate its use, without requiring the removal of any equipment from the case or rearrangement of equipment within the case. Thus, in an arrangement where the top shell is pivotally connected to the bottom shell as in an ordinary briefcase, a user merely opens the case, electrically connects the components (if necessary in lieu of a battery), and begins use. The computer is positioned such that any keyboard or disc drive is readily accessible, and the printer is properly located for printing. Consequently, minimal time is required to prepare the data processing equipment for use, and to put away the equipment after use. Yet the equipment while in use is maintained integrally with the bottom shell for its continued protection against inadvertent jostling, tilting or the like.

IN THE DRAWINGS

For a better understanding of the above features and advantages, reference is made to the detailed description and accompanying drawings in which:

FIG. 1 is a perspective view of a protective carrying case constructed in accordance with the present invention;

FIG. 2 is a sectional view taken along a vertical plane referenced by the line 2—2 in FIG. 1;

FIG. 3 is a sectional view taken along the line 3—3 in FIG. 2;

DETAILED DESCRIPTION OF THE PREFERRED EMBODIMENTS

Figure 4:
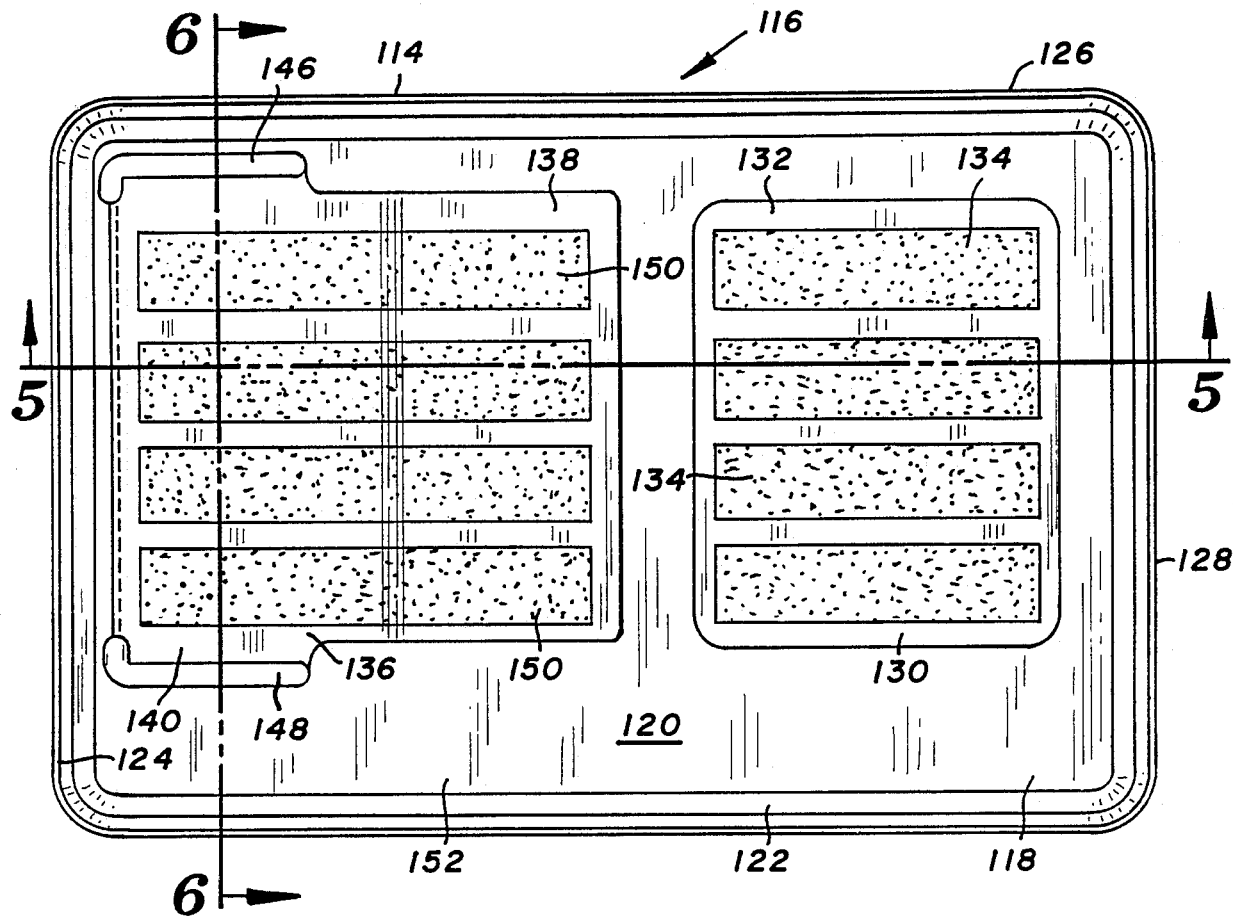
FIG. 4 is a top plan view showing a bottom shell of an alternative embodiment protective carrying case constructed in accordance with the present invention.

Turning now to the drawings, there is shown in FIG. 1 a protective case 16 for transporting data processing equipment including a computer 18, a printer 20, a power supply 22 and an electrical outlet and switch unit 24. The case includes a bottom shell 26 and a top shell 28, pivotally mounted to one another by hinges in a known manner for pivoting between an open position as shown in FIG. 1, and a closed position wherein the shells form a substantially tight enclosure.

Bottom shell 26 is formed of a rigid material, for example a plastic or metal, and includes a flat bottom wall 30 and a side wall means including side walls 32, 34, 36 and 38, all of which extend upwardly of the perimeter of the bottom wall. The top shell is similar in construction, and includes a top wall 40 and side walls 42, 44, 46 and 48 extended normal to the top wall at its perimeter. When case 16 is closed, the respective side walls of the top and bottom are aligned, and together comprise the side walls of the enclosure formed by the case.

Case 16 has a portfolio including a plurality of pouches or pockets removably attached to top wall 40. A large pocket 50 is appropriately sized to contain data storage discs, typically for magnetic data, for use with computer 18. Other pockets at 52, 54, 56 and 58 are suited for storage of pens, business cards and the like.

The components of computing equipment illustrated in FIG. 1 are in their preferred positions, not only for storage and transit, but in a position to facilitate their use as well. Computer 18 includes a pivotally connected lid 60 that can be opened to provide access to a disc drive, keyboard, control panel and the like. The computer further has an electrical cord, not shown, for connection to power supply 22. Printer 20 includes a group of switches 62 for controlling its operation, a connection 64 for an electrical cord (not shown) for supplying power to the printer, and a slot 66 for output of printed material. Computer printing paper, indicated at 67, is stored beneath the printer.

Switching and outlet unit 24 includes a bank of electrical outlets 68 and an on/off switch 70. Power supply 22 is connected to computer 18, provides power to the computer and protects the computer against surges in incoming electrical power. Unit 24 enables the operation of the printer and computer through connection to a single external power supply through a single electrical cord, and enables control of the computer and printer through a single switch.

In connection with their transit, printer 20 is integrally secured with respect to bottom shell 26 and, when top shell 28 is closed upon the bottom shell, is contiguous with the top shell along pockets 52 and 54. In a similar fashion, computer 18 is positioned to be contiguous with pocket 50 when the case is closed. To this end, the structure supporting the printer and computer is configured to position the tops of these components at approximately the same height.

As seen from FIGS. 2 and 3, the structure for supporting the data processing equipment is constructed as a unitary vacuum-formed insert 72 which nests within bottom shell 26. The insert is preferably substantially rigid, although somewhat yielding to enhance its ability to absorb the shock of any sudden impact against case 16, and of course must be of a plastic suited for vacuum-forming. One such plastic is known as ABS R-21.

Insert 72 includes a floor 74 contiguous with bottom wall 30, and a side wall means including insert side walls 76, 78, 80 and 82 contiguous with bottom shell side walls 32, 34, 36 and 38, respectively. An adhesive, indicated at 84, is provided along the contiguous surfaces of the insert and bottom shell. Alternatively, rivets can be used as a fastening means.

Vacuum-formed insert 72 includes first and second raised platforms 86 and 88, each running lengthwise in the direction of the length of computer 18. Platforms 86 and 88 are spaced apart from one another to form an upwardly open cavity 90 between them. Cavity 90 is suited for storage and positioning of wires necessary for electrical connections of computer 18, printer 20 and power supply 22. Each of platforms 86 and 88 has a flat and horizontal platform surface 92, and an elongate depression 94 formed in the center of the platform surface. Platform surfaces 92 are horizontal and positioned at a selected height from the bottom wall of the bottom shell to properly position computer 18 for the above-described connection with pocket 50.

Two upright, elongate and spaced apart pedestals, 96 and 98 respectively, support printer 20. Pedestals 96 and 98 are spaced apart from one another a distance slightly less than the length dimension of the printer. Pedestal 96 has a horizontal pedestal shelf 100 and a lengthwise vertical projection 102, and an end vertical projection 104 substantially perpendicular to projection 102. Pedestal 98 is similarly formed with a shelf 106, lengthwise vertical projection 108 and vertical projection 110. Shelves 100 and 106 support the bottom of printer 20 along opposite side edges thereof. Further, lengthwise projections 102 and 108 are parallel and spaced apart from one another a distance corresponding to the length dimension of the printer, such that the printer when resting upon the shelves is frictionally secured between projections 102 and 108. End projections 104 and 110 are positioned for engagement with a lengthwise edge of printer 20, and thereby cooperate with the lengthwise projections to positionally align the printer relative to the bottom shell.

It should be noted that the distance between pedestals, as seen from FIG. 3, is sufficient for storage of computer printout paper 67 beneath printer 20 when the printer is mounted on the pedestals. Moreover, paper 67 is stored in operative relation for feeding to the printer and eventual throughput of printer matter out of slot 66. FIG. 3 further shows a channel 112 running along one lengthwise edge of bottom shell 26, which provides a convenient storage for power supply 22 and outlet and switch unit 24.

To store the computing equipment for travel, the user simply places computer 18 on platforms 86 and 88 with the accompanying electrical cords between the pedestals, places printer 20 on pedestals 96 and 98 with an adequate supply of printout paper 67 beneath and loaded into the printer, and places unit 24 and power supply 22 within channel 112. Upon closure of top shell 28 upon the bottom shell, the various components are integrally secured within the case and substantially safe from damage. To use the equipment while in transit, the operator simply opens the top shell while maintaining bottom shell 26 in a substantially horizontal orientation, for example resting upon the lap. With the case so positioned, the user simply makes the necessary electrical connections and operates the equipment, without removing any of the equipment from the case or repositioning the equipment within the case. Any discs contained in pocket 50 can readily be loaded into computer 18 simply by lifting lid 60, again without disturbing the computer. The bottom shell thus not only conveniently positions the various components for lap-top use, but securely maintains the components in their desired positions, against inadvertent jostling and the like.

When use of the components is completed, the operator disconnects the electrical connections and closes top shell 28 upon bottom shell 26. Thus, minimal time is involved in preparing the computing equipment for use, or in storing it after use, facilitating its use even on relatively short trips.

Figure 5:
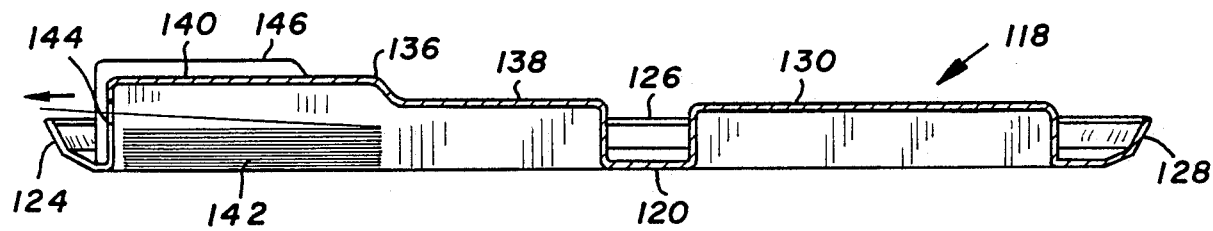
FIG. 5 is a sectional view taken along the line 5—5 in FIG. 4 showing an insert of the case of FIG. 4.
Figure 6:
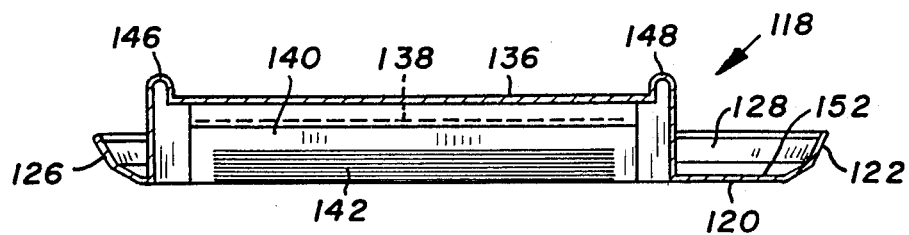
FIG. 6 is a sectional view taken along the line 6—6 in FIG. 4 showing the insert.

FIGS. 4-6 illustrate a bottom shell 114 of an alternative embodiment case 116. An insert 118 is mounted within shell 114 and conforms to the shape of the shell for a contiguous mounting to the inside surface of the shell. Insert 118 includes a horizontal floor 120 and side walls 122, 124, 126 and 128. Insert 118 further includes a raised platform 130 having a flat platform surface 132 above and spaced apart from the bottom of shell 114. Platform surface 132 is substantially planar, and a plurality of closure material strips 134 are secured to platform 130 along the platform surface.

To support a printer, the insert includes a raised pedestal 136 having horizontal pedestal surface 138 substantially at the height of platform surface 132, and a horizontal raised pedestal surface 140 slightly above surface 138 for directly supporting the printer. Raised pedestal surface 140 is disposed at a sufficient height to permit storage of computer printer paper 142 beneath the pedestal. An opening 144 rearwardly of the pedestal permits direct feeding of paper 142 to a printer mounted on the pedestal. At the opposite ends of raised pedestal surface 140 are first and second vertical projections 146 and 148, which include lengthwise and end portions for securing the printer in the manner previously described in connection with first embodiment case 16. A series of strips of closure material, commonly known by the trademark "Velcro" and indicated at 150, are secured to pedestal 136 along surfaces 138 and 140.

Corresponding strips of closure material, not illustrated, are secured to the bottom portions of a computer and printer, for releasably securing these articles respectively to platform 130 and pedestal 136. The interacting closure strips firmly secure the computer on the platform, and cooperate with projections 146 and 148 to likewise secure the printer. Portions of closure material strips 150 along pedestal surface 138 are provided for securing a power supply or the like on surface 138 and positioned between the computer and printer. Platform 130 and pedestal 136 may be offset from the center of shell 114, as shown, to provide a space or compartment at 152 for a power supply, bank of switches or the like.

What is claimed is:

1. A protective case for carrying data processing equipment, comprising:
   a substantially rigid bottom shell having a substantially flat bottom wall and a first wall means extended upwardly from the perimeter of said bottom wall;
   a substantially rigid top shell having a substantially flat top wall and a second side wall means extended normal to said top wall from the perimeter thereof, said top and bottom shells adapted to releasably engage one another along their respective side wall means to form an enclosure;
   a first mounting means integral with said bottom shell for supporting a computer in spaced apart relation to said bottom wall at a first selected vertical distance from the bottom wall, and in a select orientation relative to said bottom shell to facilitate use of the computer while it is so supported; and
   a second mounting means integral with said bottom shell for releasably and integrally supporting a printer in spaced apart relation to the bottom wall at a second selected vertical distance from the bottom wall and in a select printer orientation to facilitate use of printer while it is so supported, said second mounting means defining a first compartment under said printer for storage of computer printout paper beneath the printer, said compartment open to permit the direct feeding of the paper from the first compartment to the printer.

2. The protective case of claim 1 further including:
   means forming a second compartment within said bottom shell and adjacent said computer and said printer, for housing a power supply means to facilitate the providing of electrical power to said computer and said printer.

3. The protective case of claim 2 wherein said first mounting means comprises two spaced apart raised platforms, each platform having a substantially flat surface parallel to said bottom wall for supporting said computer.

4. The protective case of claim 3 wherein:
   said second mounting means comprises two upright pedestals spaced apart a distance sufficient to accommodate said computer paper and slightly less than the length of said printer, each pedestal having a horizontal pedestal surface and a first projection extended vertically of said pedestal surface, said first projections being parallel to one another and spaced apart a distance substantially equal to the length of said printer whereby said first projections frictionally secure said printer with respect to said pedestals, said first compartment having an open top and a width dimension to accommodate the width of said computer paper, said width dimension determined by the distance between said upright pedestals.

5. The protective case of claim 4 wherein:
each of said pedestals further includes a second projection extended vertically upwardly of said pedestal surface and substantially normal to said first projection, said second projections positioned to engage an edge of said printer, thereby to cooperate with said first projections to align said printer with respect to said bottom shell.

6. The protective case of claim 5 wherein:
said platforms and said pedestals comprise portions of a unitary vacuum-formed insert mounted inside of said bottom shell.

7. The protective case of claim 6 wherein:
said vacuum-formed insert includes a floor contiguous with said bottom wall, and an insert side wall means extended upwardly from said floor and contiguous with said first side wall means of said bottom shell.

8. The protective case of claim 7 further including:
an adhesive for securing said vacuum-formed insert to said bottom wall and first side wall means.

9. The protective case of claim 8 further including:
a pocket means secured to said top wall for containing data storage discs, said computer including a disc drive, and wherein said selected computer orientation facilitates the insertion and removal of discs from said computer when the computer is so supported.

10. The protective case of claim 9 wherein:
said pocket means is releasably secured to said top wall.

11. The protective case of claim 2 wherein:
said first mounting means comprises a raised platform having a substantially flat platform surface parallel to said bottom wall for supporting said computer.

12. The protective case of claim 11 wherein:
said second mounting means comprises a pedestal having a raised substantially horizontal pedestal surface parallel to said bottom wall for supporting said printer, said pedestal surface having a width greater than the width of said computer paper and cooperating with said bottom wall to define said first compartment, and first and second projection extended vertically of said raised pedestal surface at opposite ends thereof, said projections being spaced apart from one another a distance approximately equal to a length dimension of said printer whereby said projections frictionally secure said printer with respect to said pedestal.

13. The protective case of claim 12 wherein:
said raised platform and pedestal comprise portions of a unitary vacuum-formed insert, said vacuum-formed insert including a floor contiguous with said bottom wall, and an insert side wall means extended upwardly from said floor and contiguous with said first side wall means of said bottom shell.

14. The protective case of claim 13 further including:
an adhesive for securing said vacuum-formed insert to said bottom wall and first side wall means.

15. The protective case of claim 12 further including:
closure material secured to said platform surface and pedestal surface for releasably securing complementary closure material fastened to said computer and said printer.

16. The protective case of claim 12 including:
means defining a horizontal opening through said pedestal along an upright side portion thereof remote from said raised platform, for feeding said computer paper from said first compartment to said printer.

* * * * *